United States Patent Office 3,052,814
Patented Sept. 4, 1962

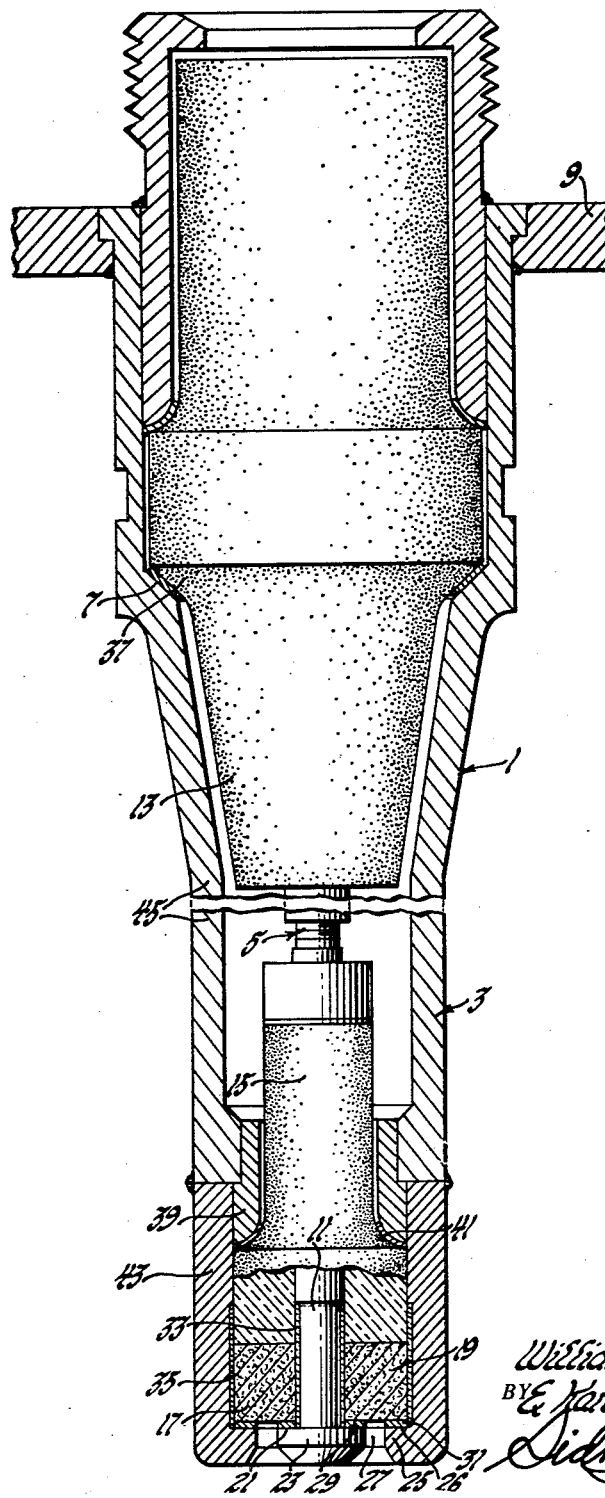

3,052,814
METHOD FOR MAKING SILICON NITRIDE-BONDED SILICON CARBIDE SEMICONDUCTORS AND RESULTING BODIES AND ARTICLES USING SAME
William R. Edwards, Davison, and Karl Schwartzwalder, Holly, Mich., assignors to General Motors Corporation, Detroit, Mich., a corporation of Delaware
Filed Mar. 23, 1959, Ser. No. 801,238
21 Claims. (Cl. 313—131)

This invention relates to silicon nitride-bonded silicon carbide semiconductor manufacturing methods, to the bodies resulting therefrom and to the articles using same. More particularly, this invention relates to methods for making $Si_3N_4$-bonded SiC semiconductor creep gap bodies and to low voltage igniter plugs adapted to use same.

It has been previously proposed to provide igniters of the so-called creep gap low voltage type. In such igniters the electrodes are so positioned as to abut in good electrical contact with a semiconductive member rather than a member of insulating material. As used herein the term "semiconductive" or equivalent terms refer to a well recognized group of materials which are neither good electrical conductors nor good electrical insulators and have a resistivity in the range of $10^{-3}$ to $10^6$ ohm-cm. at room temperature.

Creep gap type semiconductor igniters or spark plugs have the advantage of low voltage requirements for a given spark energy. Also, the heating of the creep gap surface during the discharge tends to burn off any fouling deposits. However, igniters of this type constructed in accordance with the teachings of the prior art have been unsatisfactory for the reason that the semiconductor bodies or coatings have been too porous, too weak in compressive strength and in resistance to spark erosion, and have been subject to chemical change due to oxidation in the combustion chamber with resulting change in electrical characteristics.

It is therefore an object of our invention to provide a method for forming $Si_3N_4$-bonded SiC semiconductor bodies having substantially decreased porosity and substantially increased spark erosion and thermal shock resistance, compressive strength and thermal stability. It is a further object of our invention to provide a method for forming $Si_3N_4$-bonded SiC semiconductor bodies adapted to enable sparking between electrodes in abutment therewith at about 1100 volts or less. It is a still further object of our invention to provide $Si_3N_4$-bonded SiC semiconductor bodies having greatly reduced porosity and greatly increased compressive strength and spark erosion resistance. It is a further object of our invention to provide an igniter of the low voltage creep gap type utilizing a $Si_3N_4$-bonded SiC semiconductor body in abutment with the electrodes and capable of withstanding the compressive forces, wide extremes of temperature, and vibration as well as being capable of withstanding the spark erosion effects encountered under normal operating conditions.

These and other objects of our invention are achieved by mixing a batch of raw materials the major portion of which is of −400 mesh size and comprising from about 50–75% by weight SiC and from about 25–50% by weight Si, pressure forming the material into the desired shape under high pressure, the resulting preforms being then fired on a prolonged schedule at temperatures of at least about 2400° F. in a nitrogen atmosphere. The resulting semiconductor body may then be refired in a high temperature air atmosphere prior to being assembled in an igniter under high compressive stress imposed by the abutting electrodes.

The foregoing objects as well as others which may be apparent to those skilled in the art will be readily understood from the following description taken in conjunction with the drawing on which there is shown a typical low voltage igniter assembly constructed in accordance with the teachings of our invention.

As shown on the drawing, the igniter 1 comprises a shell 3 within which a center electrode subassembly 5 is positioned in gas tight relationship therewith upon an annular seating ledge 7 formed on the inner surface of the upper portion of the shell. A mounting plate 9 is provided on the outer surface of the upper portion of the shell 3 in order to enable the positioning of the igniter within the engine in the desired manner. It should of course be understood that the shell 3 may be provided with a threaded portion on its outer surface in order to enable a threaded interconnection between the igniter and the engine in the usual manner.

The center electrode subassembly 5 comprises a center electrode 11 the upper portion of which is positioned within an insulator body 13. The lower portion of the center electrode 11 is positioned within an insulator body 15, there being provided a semiconductor body 17 between the forward end 19 of the lower insulator body and the inner surface 21 of the center electrode head 23. The radially inwardly directed end 25 of the shell 3 and the center electrode head 23 are in good electrical contact with the surface of the semiconductor body 17 adjacent the spark gap 27. As shown, a pair of temperature resistant relatively soft metal washers 29 and 31 may be interposed, respectively, between the inner surface 21 of the center electrode head 23 and the inner surface 26 of the radially inwardly turned end 25 of the shell 3. The washers 29 and 31 may be formed of such a material as nickel or its alloys and, in addition to enabling good electrical contact between the electrodes and the semiconductor body 17, they enable the substantially even distribution of compressive stress to the semiconductor body when the subassembly 5 is assembled within the shell 3. Also as shown, insulating coatings 33 and 35 may be applied to annular grooves formed, respectively, on the outer surface of the electrode and the inner surface of the shell adjacent the semiconductor body 17 in order to preclude discharge through the body rather than across its surface in spark gap 27. Such coating may be formed of a ceramic glaze, enamel or other suitable material. As is more particularly shown hereinafter, the semiconductor body itself may be provided with a glassy coating which tends to preclude short circuiting therethrough.

The center electrode subassembly 5 is sealed within the shell 3 by positioning the lower shoulder 37 of the upper insulator 13 upon the seating ledge 7 of the shell, the subassembly being subjected to axial pressure by Cico-Welding in the manner shown and well known in the art to assemble the shell and insulator in gas tight relationship upon the ledge 7. To assure good electrical contact, the semiconductor body 17 is subjected to high compressive stress between the inner surfaces 21 and 26 of the electrodes and the end surface 19 of the lower insulator 15. As shown, the retaining sleeve 39 is urged against the upper shoulder 41 of the lower insulator by the assembly of the lower end portion 43 of the shell upon the end of the upper portion 45 of the shell in the manner shown.

We have found that when a semiconductor body such as 17 is formed in accordance with the method of our invention, a body of sufficient density and strength as to be capable of resisting spark erosion and fracture due to high compressive loading during assembly as well as thermal and vibrational shock encountered during normal operation may be achieved while at the same time permitting sparking at about 1100 volts or less when using a capacitor of 0.1 microfarad.

In accordance with our invention, such bodies may be achieved from a raw material batch consisting of from about 50–75% by weight of commercially available SiC and from about 25–50% by weight of commercially available Si, the major portion of the materials being of such size as to pass through a 400 mesh sieve or of a size less than 37 microns. The preferred raw material powder mixture consists of about 37.5% SiC which passes through a 400 mesh sieve, about 37.5% SiC which passes through a 200 mesh sieve and is then milled for an extended period of time, i.e., about 10 hours in a steel ball mill, and about 25% Si which passes through a 200 mesh sieve and is subsequently milled in the same manner as noted above for the SiC. Following the milling operations stated, the SiC and the Si are each acid leached in any well known or preferred manner in order to remove iron, such acid leaching forming no part of our invention. The removal of iron is accomplished to control batch material analysis and since we have found that iron causes erratic sparking performance when present in amounts greater than about 6% by weight of the nitrided material.

We have, during the course of our investigations, prepared a large number of $Si_3N_4$-bonded SiC bodies which were subjected to sparking and burner tests in order to determine the suitability of the compositions for use as semiconductors in low voltage plugs. Table I sets forth the composition by weight percent of each body subjected to the tests shown in Tables II, III and IV.

*Table I*

| Body | −400 SiC | M.A.L.[1] SiC | −400 Si | M.A.L.[1] Si | Fe | 50% FeSi |
|---|---|---|---|---|---|---|
| 1 | 50 | | 50 | | | |
| 2 | 75 | | 25 | | | |
| 3 | | | 100 | | | |
| 3' | | | | 100 | | |
| 4 | 25 | | | 75 | | |
| 5 | 50 | | | 50 | | |
| 6 | 75 | | | 25 | | |
| 7 | 60 | | 40 | | | |
| 8 | 65 | | 35 | | | |
| 9 | 70 | | 30 | | | |
| 10 | 80 | | 20 | | | |
| 11 | 85 | | 15 | | | |
| 12 | 90 | | 10 | | | |
| 13 | | 25 | | 75 | | |
| 14 | | 75 | | 25 | | |
| 15 | 12.5 | 12.5 | | 75 | | |
| 16 | 37.5 | 37.5 | | 25 | | |
| 17 | 45 | 30 | | 25 | | |
| 18 | 52.5 | 22.5 | | 25 | | |
| 19 | 60 | 15 | | 25 | | |
| 20 | 40 | 40 | | 20 | | |
| 21 | 42.5 | 42.5 | | 15 | | |
| 22 | 45 | 45 | | 10 | | |
| 23 | 32.5 | 32.5 | | 35 | | |
| 24 | 75 | | 24.7 | | 0.3 | |
| 25 | 74.5 | | 24.83 | | 0.67 | |
| 26 | 37.5 | 37.5 | | 15 | | 10 |
| 27 | 37.5 | 37.5 | | 17.5 | | 7.5 |
| 28 | 37.5 | 37.5 | | 20 | | 5 |
| 29 | 37.5 | 37.5 | | 22.5 | | 2.5 |
| 30 | 37.5 | 37.5 | | 23.5 | | 1.5 |
| 31 | 32.5 | 32.5 | | 21 | | 14 |
| 32 | 32.5 | 32.5 | | 24.5 | | 10.5 |
| 33 | 32.5 | 32.5 | | 28 | | 7 |
| 34 | 32.5 | 32.5 | | 31.5 | | 3.5 |
| 35 | 32.5 | 32.5 | | 32.9 | | 2.1 |

[1] Milled and acid leached.

By the methods of our invention, the semiconductor bodies shown in Table I were formed in such manner as to develop the desired physical, electrical and chemical properties and enable the substantially complete conversion of Si to $Si_3N_4$. The following processing described in terms of the preferred raw material mixture as set forth above is typical of that used with each of the batch compositions. Specifically, the powdered raw materials consisting essentially of about 37.5% by weight SiC together with about 37.5% by weight SiC and about 25% Si which have been milled and acid leached, the major portion of the materials being of such size as to pass through a 400 mesh sieve, are thoroughly intermixed with an organic binder such as a volatilizable wax emulsion, the quantity of emulsion being sufficient to yield a wax content of about 7½% by weight of the Si and SiC raw material batch. The wax material merely acts as a binder for facilitating handling and as a lubricant in subsequent die-pressing operations. It is thus apparent that other organic materials may be used such as oils capable of being volatilized at temperatures of about 1000° F. The resulting mixture is then dried, about 100° C. having been found to be suitable, to remove all moisture, i.e., water and alcohol, present in the emulsion, the dried material being powdered as necessary and loaded into a steel die for forming into a body having the desired shape. We have found that dense semiconductor bodies suitable for use as creep gap members in low voltage igniters or spark plugs may be formed as washer type bodies by application of from about 30,000 to 50,000 p.s.i. to sufficient material to form a body of the desired thickness. We have found that bodies having maximum density have been achieved by using a pressure of about 50,000 p.s.i.

The resulting preforms are then fired in a nitrogen atmosphere in such manner as to first volatilize the binder followed by high temperature treatment for the conversion of the Si to $Si_3N_4$. Specifically, the preforms are loaded into the gas discharge end of a constant flow firing chamber through which purified nitrogen flows at a constant rate, a rate of about 0.65 cu. ft./hr. having been found to be satisfactory. The use of nitrogen containing hydrogen has been found to be unsuitable due to the reducing action of the hydrogen on the SiC. The wax binder is slowly volatilized over a period of about 3–5 hours, depending on the quantity of material being treated, by gradually progressing the bodies into the furnace which is maintained at about 1050° F. Upon completion of wax removal, indicated by the absence of vapors in the gas emerging from the furnace, a very slow nitriding schedule is begun to avoid formation of a body having only a thick nitrided skin. More particularly, the furnace temperature is raised from about 1050° F. to about 2400° F. in about a 5-hour period where it is maintained for a period of from about 16 to 19 hours. The temperature is then raised over a period of about one hour to about 2550° F. where it is held for about 24 hours. The temperature is then raised to about 2600° F. within a period of about ½ hour and soaked at this temperature for a period of 24 hours. The furnace is then cooled and the preforms removed. The resultant nitrided preforms were then cleaned by a light sanding operation to remove a white cottony siliceous material. The resultant body was found to have a very hard and dense surface. The time and temperatures should be such as to achieve a fully nitrided body, about 48 hours at a minimum of about 2400° F. being adequate depending on the amount and dimensions of the bodies.

The nitrided bodies were subjected to sparking voltage tests as shown in Table II, the number of each body representing the raw material batch composition shown in Table I.

Table II
SPARKING VOLTAGES OF Si₃N₄—SiC SAMPLES

| Body | Initial | | After accelerated** sparking | | Initial | | After accelerated** sparking | | End of 40-hour burner test | |
|---|---|---|---|---|---|---|---|---|---|---|
| | .1 mfd. | 1 mfd. | .1 mfd. | 1 mfd. | .1 mfd. | 4 mfd. | .1 mfd. | 4 mfd. | .1 mfd. | 4 mfd. |
| 1 | 1,100 | 500 | 700 | 600 | 700 | 300 | 700 | 500 | 650 | 500 |
| 2 | | | | | 950 | 700 | 600 | 350 | 800 | 600 |
| 3 | | | | | No spark | | | | 700 | 400 |
| 3' | 1,100 | 900 | >1,800 | 900 | | | | | | |
| 4 | >1800 | | | | | | | | | |
| 5 | 1,500 | 1,200 | 900 | 900 | | | | | 900 | 600 |
| 6 | 1,100 | 600 | 700 | 600 | | | | | 900 | 750 |
|  | 1,100 | 1,000 | 800 | 600 | | | | | 800 | 400 |
| 7 | 1,000 | 700 | 800 | 600 | 950 | 500 | 850 | 500 | | |
| (*) | | | | | | | | | 800 | 500 |
| 8 | 1,000 | 700 | 700 | 700 | 950 | 600 | 800 | 600 | | |
| (*) | | | | | | | | | 700 | 500 |
| 9 | 800 | 600 | 600 | 400 | No spark | | | | | |
| 10 | | | | | No spark | | | | | |
| 11 | | | | | No spark | | | | | |
| 12 | | | | | | | | | | |
| 13 | 1,500 | 1,500 | 1,500 | 600 | | | | | 800 | 700 |
| 14 | 1,200 | 1,000 | 800 | 800 | | | | | | |
|  | 1,000 | 600 | 600 | 500 | | | | | | |
| 15 | 1,600 | 1,000 | 1,200 | 900 | | | | | 750 | 450 |
| 16 | 1,200 | 900 | 600 | 500 | | | | | 800 | 400 |
|  | 1,000 | 800 | 800 | 800 | | | | | | |
|  | 800 | 600 | 600 | 500 | 950 | 600 | 500 | 400 | | |
|  | | | | | 900 | 700 | 800 | 600 | | |
| (*) | 800 | 800 | 800 | 600 | 1,100 | 650 | 800 | 600 | | |
| (*) | | | | | 1,100 | 900 | 800 | 750 | | |
| (*) | | | | | | | | | 800 | 500 |
| 17 | 900 | 800 | 700 | 400 | | | | | 800 | 500 |
| 18 | 1,100 | 800 | 800 | 700 | 750 | 500 | 700 | 450 | | |
| (*) | | | | | | | | | 700 | 500 |
| 19 | 1,000 | 500 | 700 | 400 | 1,300 | 900 | 950 | 850 | | |
| (*) | | | | | | | | | 700 | 600 |
| 20 | 1,100 | Shorting 800 | | 600 | 400 | | | | | |
| 21 | | Shorting | | | | | | | | |
| 22 | 1,300 | Shorting 900 | 1,100 | 800 | | | | | 800 | 500 |
| 23 | 900 | 700 | 800 | 600 | 1,100 | 650 | 850 | 700 | | |
| (*) | | | | | 1,150 | 1,050 | 900 | 600 | | |
| 24 | | | | | | | | | | |
| 25 | 1,000 | 600 | 1,000 | 600 | | | | | 800 | 600 |
| 26 | 1,200 | 650 | 1,050 | 700 | | | | | 900 | 700 |
| 27 | 900 | 800 | 700 | 550 | | | | | 900 | 700 |
| 28 | 1,300 | 1,050 | 800 | 500 | | | | | 700 | 600 |
| 29 | 800 | 650 | 500 | 450 | | | | | | |
| 30 | 750 | 650 | 500 | 400 | | | | | | |
| 31 | 1,100 | 500 | 850 | 600 | | | | | | |
| 32 | 1,150 | 700 | 1,100 | 600 | | | | | 1,150 | 950 |
| 33 | 850 | 650 | 850 | 600 | | | | | Erratic | |
| 34 | 1,000 | 700 | 800 | 600 | | | | | | |
| 35 | 950 | 650 | 700 | 550 | | | | | | |

*Refired at 2,960° F.   **Sparking for 3-5 minutes at 1,500 v. and 4 mfd.

It is readily apparent from Table II that raw material batch compositions of from about 50-75% SiC and from 25-50% Si₃N₄ have sparking capabilities enabling their use as creep gap elements in ignition systems of about 1100 volts or less and using capacitors of .1, 1 or 4 microfarads.

From an examination of the sparking data we have found that a comparison of the initial sparking values with those obtained after accelerated sparking was a quick way of evaluating spark erosion resistance. A body having poor resistance to spark erosion will show an increase in sparking voltage after accelerated sparking whereas one with good resistance shows a decrease. Further, it appears that accelerated sparking has an aging or preconditioning effect in that a lower sparking voltage is generally made possible thereafter, it being theorized that accelerated sparking establishes a path for subsequent sparking. As used, initial sparking values represent the initial breakdown voltage, at a specific capacitance, at which steady sparking is obtained.

Similarly, an examination of the 40 hour burner test data shows that the effects of heat and oxidation on both the physical and electrical characteristics were such as to substantiate the suitability of such nitrided bodies for use as low voltage semiconductor bodies, the sparking voltages being less than 1000 volts and the physical state of the bodies being uneffected by the prolonged heating. In conducting the 40 hour burner tests, the bodies are subjected to an oil burner flame at a temperature of from 1800 to 1900° F. in a series of five 8-hour periods with removal from flame and cooling after each period. After being subjected to such vigorous simulated operating conditions the semiconductor bodies are checked for minimum sparking voltage by positionnig the body in a variable voltage capacitor discharge type power supply delivering about 6 sparks per second, the minimum voltage being determined by increasing the output voltage gradually until steady sparking is observed. The 40 hour burner tests disclosed no burner or spark erosion in those bodies made from batch compositions within the range of from about 50-75% SiC and about 25-50% Si₃N₄. However it was observed that those bodies containing from about 50% to less than about 55% SiC were more inconsistent in sparking performance. Our preferred raw material batch composition is therefore from about 55-75% SiC and from about 25-45% Si₃N₄. It was also observed that by incorporating the very fine SiC, the milled and acid leached material, into the raw material batch along with the less than —400 mesh SiC, the required density and strength and spark erosion resistance of the resultant nitrided body was achieved.

It will be noted that the bodies identified as Nos. 24-35 were formed from batch compositions wherein a portion of the Si was substituted for by Fe and 50% ferro-silicon. As noted above, the presence of the Fe, if in relatively small amounts as noted, has no detrimental effect on the physical or electrical properties of the resultant nitrided body. The same is true as regards those bodies containing ferro-silicon where the amounts are less than about 10% by weight of the batch material. We have found however that while the ferro-silicon when present in small amounts has no beneficial effect on the resultant nitrided bodies, such material has an adverse effect on the sparking voltage when present in amounts greater than about 10% by weight.

Table III
REFIRE SPARKING VOLTAGES (BODY 19)

| Refire temp., °F. | Cone deformation | Initial | | After accel. sparking* | | Percent porosity | Compressive strength (p.s.i.) |
|---|---|---|---|---|---|---|---|
| | | .1 mfd. | 4 mfd. | .1 mfd. | 4 mfd. | | |
| As nitrided | | 1,000 | 575 | 500 | 325 | 23.32 | 33,855 |
| 2,600 | | 1,100 | 600 | 860 | 650 | 9.32 | 49,435 |
| 2,700 | | 925 | 725 | 810 | 675 | 11.59 | 87,090 |
| 2,800 | | 975 | 625 | 725 | 550 | 8.34 | 58,390 |
| 2,900 | 29D, 30¹ | 1,250 | 870 | 725 | 775 | 3.25 | 97,460 |
| 2,960 | 30³, 31¹ | 1,125 | 660 | 810 | 590 | 5.73 | 87,142 |
| 3,000 | 31D, 32¹ | Over fired, samples bloated. | | | | | |

*3 minutes at 1,500 v., 4 mfd.

We have also found, as shown in Table III, that the nitrided bodies obtained by the methods of our invention may be formed with greatly decreased porosity and increased compressive strength without any adverse effect upon the sparking voltage by subjecting the nitrided bodies to a high temperature refire in an air atmosphere upon the removal from the nitriding furnace. We have found that during the refire operation the surface of the SiC starts to disassociate and a $SiO_2$ film is formed. This film of $SiO_2$ prevents any appreciable disassociation of the SiC and it is believed that the increased density and strength of the resulting bodies may be attributed to the formation of the $SiO_2$ film during the refire operation. During refire, the nitrided bodies were heated in a static air furnace at Orton Cone 29D, 30¹ and 30³, 31¹, and at temperatures varying from about 2700 to about 2960° F. for a period of at least about one hour. Refiring may be achieved by using an overall cycle period (time in-time out) of about 24 hours. After refire treatment it is of course necessary to clean the semiconductor surface which is to be positioned adjacent a spark gap in order to remove the thin glassy insulating film of $SiO_2$ formed thereon.

The porosity was determined by determining the dry weight of the test body in air, weighing the body while submerged in water after saturating the body with water by boiling for a period of from 3 to 4 hours, and determining the saturated weight of the body by weighing in air after boiling in water. Apparent porosity is then calculated by the following formula:

$$\text{Percent porosity} = \frac{\text{saturated wt.} - \text{dry wt.}}{\text{saturated wt.} - \text{submerged wt.}} \times 100$$

The endurance characteristics of the semiconductor bodies formed from raw batch materials of 75% SiC and 25% Si and subjected to refiring were checked by subjecting the bodies to the endurance portion of the British Approval MOS Spec. DERD 2090 (Issue 2) which consists of 750 cycles of 45 seconds' sparking followed by 45 seconds' rest, the voltage being set at 1700 and discharging through an 8 microfarad capacitor. JP–4 fuel is made to drip on the firing tip of the test igniter and semiconductor body continuously at the rate of 10 drops per minute to simulate actual operating conditions. The results of these tests disclose that the refiring operation increased the average life under oil drip sparking conditions by more than 230%. The semiconductor material was found to be still intact when the tests were stopped because of centerwire erosion. The life expectancy of the refired semiconductor material was shown to be about 260% of the 750 cycles required by the test specification.

Table IV
SPARKING VOLTAGES

| Body | As nitrided | | | | After refire (Orton cone 30³, 31¹) | | | |
|---|---|---|---|---|---|---|---|---|
| | Initial | | After accel.* sparking | | Initial | | After accel.* sparking | |
| | .1 mfd. | 1 mfd. | .1 mfd. | 1 mfd. | .1 mfd. | 4 mfd. | .1 mfd. | 4 mfd. |
| 8 | 1,000 | 700 | 800 | 600 | 950 | 500 | 850 | 500 |
| 9 | 1,000 | 700 | 700 | 700 | 950 | 600 | 800 | 600 |
| 21 | 1,100 | 800 | 800 | 700 | 750 | 500 | 700 | 450 |
| 22 | 1,000 | 500 | 700 | 400 | 1,300 | 900 | 950 | 850 |
| 26 | 900 | 700 | 800 | 600 | 1,100 | 650 | 850 | 700 |

*3–5 minutes at 1,500 v., 4 mfd.

As shown in Table IV and those tests in Table II noted by a single asterisk (*), refiring the nitrided bodies at a temperature of 2960° F., has no detrimental effect on the sparking characteristics thereof while, as shown in Table III, greatly improving the density and compressive strength of the bodies.

From the foregoing it is apparent that we have provided a method for forming $Si_3N_4$-bonded SiC bodies having density and compressive strength characteristics as well as endurance characteristics and spark erosion resistance such as to enable the bodies to be used as semiconductor materials adjacent the spark gap of low voltage creep gap igniters or spark plugs. As used herein and in the attached claims, the designation "—400" mesh size is descriptive of materials passing through a 400 mesh sieve. While we have described our invention in terms of our preferred embodiment, modifications thereof will be apparent to those skilled in the art, such modifications being within the intended scope of the claims which follow.

What is claimed is:

1. A process for the manufacture of $Si_3N_4$-bonded SiC semiconductor bodies comprising the steps of mixing from about 50–75% by weight SiC with from about 25–50% by weight Si with a major portion of the materials being of —400 mesh size, molding said mixture into a body of the desired shape using high pressure of at least about 30,000 p.s.i. and not in excess of about 50,000 p.s.i., nitriding said body over a prolonged firing schedule to substantially completely nitride said Si material and form a body having a very hard and dense surface and being highly resistant to spark erosion and having high compressive strength, cooling said body, and cleaning said body to remove siliceous material formed on the surface thereof, said schedule comprising the steps of passing a continuous stream of purified nitrogen over the body while heating the body at temperatures of at least about 2400° F. for a period sufficient to complete the nitriding reaction.

2. A process in accordance with claim 1 wherein the materials to be mixed consist essentially of about 55–75% by weight SiC and about 25–45% by weight Si, the body being heated at successively higher temperature levels during a period of about 48 hours.

3. A process in accordance with claim 1 wherein the materials to be mixed consist essentially of about 75% by weight SiC with about 25% by weight Si.

4. A process in accordance with claim 1 wherein the materials consist essentially of about 37.50% SiC of less than 400 mesh size, about 37.50% milled and acid leached SiC, about 25% milled and acid leached Si and a volatile organic binder in an amount of about 7.5% of the batch material, drying the resultant material mixture to remove any moisture present therein, said heating schedule comprising the steps of loading the body into the gas discharge end of the firing chamber, slowly volatilizing the organic binder by heating the body for a period of from 3-5 hours, raising the temperature to about 2400° F. over a period of about 5 hours and maintaining such temperature for from 16-19 hours, raising the temperature to about 2550° F. in about one hour and maintaining the temperature for a period of about 24 hours and raising the temperature to about 2600° F. in about one-half hour and maintaining such temperature for about 24 hours, the milled and acid leached SiC serving to provide a very fine material without iron content for achieving the desired compressive strength and density of the nitrided body while maintaining good spark erosion resistance.

5. A process in accordance with claim 1 wherein the cleaned nitrided bodies are refired in an air atmosphere at an elevated temperature and for an extended period to greatly increase the compressive strength, density and spark erosion resistance of the body without adverse effect on sparking voltage characteristics.

6. A process in accordance with claim 2 wherein the cleaned nitrided bodies are refired in an air atmosphere at a temperature of from about 2700 to about 2960° F. for a period of at least about one hour to greatly increase the compressive strength, density and spark erosion resistance of the body without adverse effect on sparking voltage characteristics.

7. A process in accordance with claim 3 wherein the cleaned nitrided bodies are refired in an air atmosphere at about Orton Cone 29$^D$, 30$^1$ to greatly increase the compressive strength, density and spark erosion resistance of the body without adverse effect on sparking voltage characteristics.

8. A process in accordance with claim 4 wherein the cleaned nitrided bodies are refired in an air atmosphere at about Orton Cone 30$^3$, 31$^1$ to greatly increase the compressive strength, density and spark erosion resistance of the body without adverse effect on sparking voltage characteristics.

9. A silicon nitride-bonded silicon carbide body formed from a raw material batch consisting essentially of from about 50-75% by weight silicon carbide and about 25-50% by weight silicon in which substantially all the free silicon of said batch is combined with nitrogen, said body being very hard and dense and having a compressive strength at room temperature of at least about 30,000 p.s.i. and a porosity not in excess of 25%, the major portion of said raw materials being of —400 mesh size.

10. A body as set forth in claim 9 formed from a raw material batch consisting essentially of from about 55-75% by weight silicon carbide and about 25-45% by weight silicon.

11. A body as set forth in claim 9 formed from a raw material batch consisting essentially of about 75% by weight silicon carbide and about 25% by weight silicon.

12. In a low voltage spark igniter, the combination comprising a metal shell, a center electrode subassembly positioned within said shell and in gas-tight relationship upon an annular seating ledge provided on the inner surface thereof, said subassembly comprising a center electrode sleeved within an insulator and having a sparking head formed on the end thereof, a semiconductor body positioned about said center electrode between said head and the end of said insulator, annular ground electrode formed on the end of said shell and directed radially inward toward and spaced apart from said sparking head to form a spark gap therewith, said semiconductor body being in good electrical contact with and placed under high compressive forces by said ground electrode and said sparking head, said semiconductor body consisting of silicon nitride-bonded silicon carbide having high compressive strength and spark erosion resistance, said igniter being capable of sparking at voltages not exceeding 1100 volts and said body being formed from a raw material batch consisting essentially of from about 50-75% by weight silicon carbide and about 25-50% by weight silicon in which substantially all the free silicon of said batch is combined with nitrogen, said body being very hard and dense and having a compressive strength at room temperature of at least about 30,000 p.s.i. and a porosity not in excess of 25%, the major portion of said raw materials being of —400 mesh size.

13. The device as set forth in claim 12 wherein said silicon carbide has a film of silicon dioxide, the compressive strength of said body being at least about 49,000 p.s.i. and the porosity being not in excess of about 12%, the surface of said body adjacent the spark gap being ground-off.

14. The device as set forth in claim 12 wherein said silicon carbide has a film of silicon dioxide formed thereon, the compressive strength being at least about 49,000 p.s.i. and the porosity being not in excess of about 12%, and said body being formed from a raw material batch consisting essentially of from about 55-75% by weight silicon carbide and about 25-45% by weight silicon, said body having a clean surface adjacent the spark gap.

15. The device as set forth in claim 12 wherein said silicon carbide has a film of silicon dioxide formed thereon, the compressive strength being at least 49,000 p.s.i. and the porosity being not in excess of about 12%, and said body being formed from a raw material batch consisting essentially of about 75% by weight silicon carbide and about 25% by weight silicon, said body having a clean surface adjacent the spark gap.

16. The device as set forth in claim 12 wherein said silicon carbide has a film of silicon dioxide formed thereon, the compressive strength being at least 49,000 p.s.i. and the porosity being not in excess of about 12%, and said body being formed from a raw material batch consisting essentially of about 37.5% by weight silicon carbide, about 37.5% by weight milled and acid leached silicon carbide and about 25% by weight milled and acid leached silicon, said body having a clean surface adjacent the spark gap.

17. A silicon nitride-bonded silicon carbide body formed from a raw material batch consisting essentially of about 37.5% by weight silicon carbide, about 37.5% by weight milled and acid leached silicon carbide and about 25% by weight milled and acid leached silicon in which substantially all the free silicon of said batch is combined with nitrogen, said body being very hard and dense and having a compressive strength at room temperature of at least about 30,000 p.s.i. and a porosity being not in excess of about 25%, the major portion of said raw materials being of —400 mesh size.

18. A body as set forth in claim 17 wherein the surface of the silicon carbide has a film of silicon dioxide formed thereon, the compressive strength being at least about 49,000 p.s.i. and the porosity not in excess of about 12%.

19. A silicon nitride-bonded silicon carbide body formed from a raw material batch consisting essentially of from about 50-75% by weight silicon carbide and about 25-50% by weight silicon in which substantially all the free silicon of said batch is combined with nitrogen, said body being very hard and dense and having a compressive strength at room temperature of at least about 49,000 p.s.i. and the porosity being not in excess of about 12%, the major portion of said raw materials being of —400 mesh size and the silicon carbide having a film of silicon dioxide formed on the surface thereof.

20. A silicon nitride-bonded silicon carbide body formed from a raw material batch consisting essentially of from about 55-75% by weight silicon carbide and about 25-45% by weight silicon in which substantially all the free silicon of said batch is combined with nitrogen, said body being very hard and dense and having a compressive strength at room temperature of at least about 49,000 p.s.i. and the porosity being not in excess of about 12%, the major portion of said raw materials being of —400 mesh size and the silicon carbide having a film of silicon dioxide formed on the surface thereof.

21. A silicon nitride-bonded silicon carbide body formed from a raw material batch consisting essentially of about 75% by weight silicon carbide and about 25% by weight silicon in which substantially all the free silicon of said batch is combined with nitrogen, said body being very hard and dense and having a compressive strength at room temperature of at least about 49,000 p.s.i. and the porosity being not in excess of about 12%, the major portion of said raw materials being of —400 mesh size and the silicon carbide having a film of silicon dioxide formed on the surface thereof.

References Cited in the file of this patent

UNITED STATES PATENTS

| | | |
|---|---|---|
| 2,088,945 | Xardell | Aug. 3, 1937 |
| 2,391,456 | Hensel | Dec. 25, 1945 |
| 2,609,318 | Swentzel | Sept. 2, 1952 |
| 2,684,665 | Tognola | July 17, 1954 |

FOREIGN PATENTS

| | | |
|---|---|---|
| 724,211 | Great Britain | Feb. 16, 1955 |

OTHER REFERENCES

Fundamental Chemistry by Deming, pub. by Wiley, 1940, page 697.